US011528915B2

(12) United States Patent
Strohm et al.

(10) Patent No.: US 11,528,915 B2
(45) Date of Patent: *Dec. 20, 2022

(54) CLOSURE MODULE AND METHOD FOR CLOSING AND/OR SEPARATING FILLED SAUSAGE CASINGS CONNECTED VIA A SAUSAGE NECK

(71) Applicant: Albert Handtmann Maschinenfabrik GmbH & Co. KG, Biberach (DE)

(72) Inventors: Kurt Strohm, Attenweiler (DE); Gerhard Schliesser, Wain (DE); Manfred Baechtle, Schemmerhofen (DE); Robert Winghart, Oberstadion (DE); Florian Osswald, Ulm (DE); Jochen Merk, Ochsenhausen (DE)

(73) Assignee: Albert Handtmann Maschinenfabrik GmbH & Co. KG, Biberach (DE)

( * ) Notice: Subject to any disclaimer, the term of this patent is extended or adjusted under 35 U.S.C. 154(b) by 607 days.

This patent is subject to a terminal disclaimer.

(21) Appl. No.: 16/460,654

(22) Filed: Jul. 2, 2019

(65) Prior Publication Data

US 2020/0000108 A1 Jan. 2, 2020

(30) Foreign Application Priority Data

Jul. 2, 2018 (EP) ..................... 18181189

(51) Int. Cl.
*A22C 13/00* (2006.01)
*B29C 65/04* (2006.01)
(Continued)

(52) U.S. Cl.
CPC .......... *A22C 13/0009* (2013.01); *B29C 65/04* (2013.01); *B29C 65/743* (2013.01);
(Continued)

(58) Field of Classification Search
CPC ... A22C 11/10; A22C 13/0009; A22C 11/125; A22C 11/006
(Continued)

(56) References Cited

U.S. PATENT DOCUMENTS 3,382,641 A * 5/1968 Jensen ............... A22C 13/0003
53/138.4
3,992,606 A 11/1976 Arutt et al.
(Continued)

FOREIGN PATENT DOCUMENTS

AT 178854 B 6/1954
DE 1080011 B 4/1960
(Continued)

OTHER PUBLICATIONS

Japanese Patent Office, Office Action Issued in Application No. 2019-114872, dated Jul. 21, 2020, 6 pages.
(Continued)

*Primary Examiner* — Richard T Price, Jr.
(74) *Attorney, Agent, or Firm* — McCoy Russell LLP

(57) ABSTRACT

A closure module and a method for closing and/or separating filled sausage casings connected via a sausage neck, comprising two stamps movable relative to and towards each other and arranged such that a sausage neck can be placed therebetween, the stamps being capable of clamping the sausage neck in a closed condition, and further comprising a first and a second electrode, through which, in a closed condition of the stamps, a current can flow from the first electrode into the sausage neck and via the sausage neck into the second electrode.

20 Claims, 6 Drawing Sheets

(51) Int. Cl.
    *B29C 65/74*         (2006.01)
    *B29C 65/78*         (2006.01)
    *B29C 65/00*         (2006.01)
    *B29L 23/00*         (2006.01)

(52) U.S. Cl.
    CPC ...... *B29C 65/7841* (2013.01); *B29C 66/4312* (2013.01); *B29C 66/849* (2013.01); *B29C 66/8614* (2013.01); *B29L 2023/002* (2013.01)

(58) Field of Classification Search
    USPC .......................................................... 452/46
    See application file for complete search history.

(56) References Cited

U.S. PATENT DOCUMENTS 5,073,141 A * 12/1991 Lemmer ............... A22C 11/001
                                                            99/441
2004/0211156 A1     10/2004     Vermee

FOREIGN PATENT DOCUMENTS

| | | |
|---|---|---|
| EP | 1609366 A1 | 12/2005 |
| GB | 716783 A | 10/1954 |
| JP | H01310893 A | 12/1989 |
| JP | 2002331586 A | 11/2002 |
| JP | 2004208600 A | 7/2004 |
| JP | 2006006228 A | 1/2006 |
| KR | 20040017104 A | 2/2004 |
| KR | 1020040017104 A | 2/2004 |
| WO | 9407371 A1 | 4/1994 |

OTHER PUBLICATIONS

China National Intellectual Property Administration, Office Action and Search Report Issued in Application No. 201910585442.X, dated Jan. 28, 2021, 20 pages.

* cited by examiner

CLOSURE MODULE AND METHOD FOR CLOSING AND/OR SEPARATING FILLED SAUSAGE CASINGS CONNECTED VIA A SAUSAGE NECK

TECHNICAL FIELD

The present disclosure relates to a closure module and a method for closing and/or separating filled sausage casings connected via a sausage neck and also for closing and/or separating sausage casing ends.

BACKGROUND AND SUMMARY

In the production of sausage products by means of filling and portioning systems, mainly natural, artificial and collagen casings are used as sausage casings and are filled with sausage meat by means of a vacuum filler. Through constricting and dividing (e.g. twisting off) the filled sausage casings within the twist-off line, a sausage chain consisting of a plurality of connected, filled sausage casings, i.e. portions, is obtained. The connected portions are closed at defined division points such that the division point cannot open again during the separation process executed e.g. with the aid of a knife. Likewise, open sausage ends must be closed, if sausage casings tear, and the end of the sausage chain must be closed as well.

For closing sausage portions, e.g. clippers used for applying metal clips are known. EP 1609366 already describes that two neighboring sausage portions have applied thereto an electric current, which will then flow from one sausage portion to the neighboring sausage portion, whereby the intermediate sausage neck can be cut. Due to the fact that the current is coupled into the sausages, comparatively high currents are necessary. Therefore, it cannot be excluded that reactions may take place in the filling material and that the delicate sausage casings may get damaged. Moreover, there will also be a direct contact between the electrodes and the rounded sausage ends of the sausage portions. At the rounded sausage ends mechanical stress is, however, caused by the e.g. twisted-off division point and the displacement of the sausage meat. If a current is introduced at the rounded sausage end, the sausage casing, which is under mechanical stress, may tear when heated. This may happen especially in the case of delicate natural casings. Another drawback of the known device is to be seen in that the end of the sausage chain cannot be closed, since, for applying the voltage, two sausages will always be necessary. Also a changeover for different calibers is laborious.

Against this background, it is the object of the present disclosure to provide an improved closure module and an improved method for closing and/or separating filled sausage casings connected via a sausage neck, which allow the filled sausage casings to be closed, even at the end of the sausage chain, more carefully, more easily and more reliably.

According to the present disclosure, a closure module is provided for closing and/or separating filled sausage casings connected via a sausage neck, the closure module comprising two stamps movable relative to and towards each other and arranged such that a sausage neck can be placed therebetween, the stamps being capable of clamping the sausage neck in a closed condition, and further comprising a first and a second electrode, through which, in a closed condition of the stamps, a current can flow from the first electrode into the sausage neck and via the sausage neck into the second electrode.

The stamp may be configured as an integral or as a multi-part component. The movable stamps are arranged such that a sausage neck can be placed therebetween, i.e. that the stamps are arranged on opposite sides of the sausage neck. The stamps can be moved relative to and towards each other. This means that at least one stamp can be moved towards the other, so that the distance between the stamps can be reduced and the intermediate sausage neck can be clamped in position, without, however, being cut off by the stamps. Hence, the sausage neck is reliably held during closing and/or separating. The current for closing and/or separating can only flow in the closed condition of the stamps, since the sausage neck, i.e. the twisted-off sausage casing by way of example, located between the stuffed sausage portions serves as an electrolyte between the pair of electrodes. Hence, the current can flow from one electrode through the sausage neck to the other electrode. The electric energy is converted into thermal energy when passing through the sausage neck (resistance) and heats the latter. The electrodes are not in contact with the sausage casing, but they only contact the sausage neck. In natural casings, for example, the thermal denaturation of collagen (coagulation of protein) will then begin. In addition, from approx. 100° onwards, water evaporates, so that the natural casing of the sausage neck coagulates and will thus be closed. This means that the successive filled sausage casings are closed via the sausage neck, but are still connected to one another. A further supply of energy leads to a rise in temperature and to a decomposition and cutting off of the casing. In principle, it is possible to heat the sausage neck only to such an extent that it coagulates and the filled sausage casings are closed. A very important aspect of the present disclosure is the clamping of the sausage neck or of the open sausage end (in the case of the last portion of the chain). At the rounded sausage end, mechanical stresses acting on the sausage casing are caused by the e.g. twisted-off division point and by the displacement of the sausage mass (sausage meat). If a current is now introduced at the rounded sausage end, the sausage casing, which is under mechanical stress, may tear during heating. Due to the fact that the sausage neck is clamped before the transition to the rounded sausage end, the mechanical stresses are "held back". Through the electrodes the current is introduced between the clamped points or in the area of the clamped point within the sausage neck or the open sausage end and will thus not flow across the sausage casing of the rounded sausage ends, which is under mechanical stress. The clamping of the division point must not be eliminated until the flow of current has terminated and the denaturation of e.g. the natural casing has taken place, so that reliable closing will be possible. In this way, damage to the rounded sausage ends during cutting off can be prevented effectively.

The present disclosure is also advantageous insofar as, due to the fact that the sausage neck can be closed, or closed and separated via the stamps and electrodes which are adapted to be moved towards one another, even the last sausage on the end of a sausage chain can be closed. It follows that, in comparison with the prior art, an additional portion with or without sausage meat is no longer necessary for closing a sausage portion at the end of a sausage group. In the prior art, an additional empty casing has often been produced, so that e.g. a knot could be made at the end of a sausage group. Furthermore, when an additional empty portion was produced in the prior art, it was necessary that, prior to closing, the operator pushed back the sausage mass into the sausage portion to be closed and paid attention to the length of the portion and its degree of stuffing. The present disclosure therefore allows a reduction of the costs for casings and/or sausage meat.

Moreover, product optimization is accomplished with respect to weight, length, visual appearance and stuffing degree of the portions to be closed. All in all, reliably closed sausage ends will also lead to hygienic improvements.

Since the movable stamps are moved on the sausage neck, whose diameter is substantially always the same, the closure module can be used for different calibers in an arbitrary manner, without any mechanical changeover being necessary.

Another advantage is that no consumables, such as a metal clip, are required. Hence, there will be no foreign material in the product.

Furthermore, the performance will be improved and the costs reduced by a reduction of the closure time and a reduction of the consumption of casings.

The stamp element has not only the advantageous function of pinching off the sausage neck, but it is also used as a spacer and isolator to the rounded sausage end or the two rounded sausage ends.

According to the present disclosure, the electrodes are therefore arranged such that, in a closed condition of the stamps, they are spaced apart from the rounded sausage ends of the sausage casings such that the electrodes do not contact the filled sausage casings and are electrically insulated therefrom.

A clamping point of the stamps is here arranged on at least the respective side of the electrodes facing the rounded sausage end of the sausage neck (i.e. the respective side facing outwards). It follows that a plurality of clamping points or one continuous clamping point may be provided in the longitudinal direction of the sausage neck. The essential point is that the sausage neck can be clamped on both sides beside the electrodes.

According to the present disclosure, both electrodes may be arranged e.g. in one stamp in spaced relationship with each other. In this case, the current can flow from an electrode into the sausage neck and in a longitudinal direction through the sausage neck up to the second electrode. In the case of some types of casings, it turned out that, when the current flows through the sausage neck in a longitudinal direction, a higher process reliability is given than in cases where the current flows only transversely to the division point.

It is, however, also possible to arrange the first electrode in one of the stamps and the second electrode in the opposite stamp. The electrodes may here be arranged in direct opposition, so that the current will flow transversely to the longitudinal direction through the sausage neck. According to an advantageous embodiment, the electrodes may, however, also be arranged on opposite sides of the sausage neck such that they are laterally (i.e. in a longitudinal direction) displaced relative to each other. Also this leads to the advantage that the current will again flow in a longitudinal direction through the sausage casing. This is of advantage for some types of sausages. When the electrodes are arranged on opposite sides, i.e. in the respective opposed stamps, the electrodes can be moved relative to and towards each other by closing the stamps, so that, finally, the current can flow through the sausage neck.

According to the present disclosure, the electrodes in the stamps are insulated towards the outside and a free contact area is provided on their end facing the sausage neck. The electrodes may here be arranged together in one stamp, i.e. in a stamp configured as an integral component, or each electrode may be arranged in a stamp element of its own. These stamp elements may then be joined by a screw connection so as to form one stamp.

According to an advantageous embodiment, the electrodes are coated with an insulating material or are potted in an insulating material, except for the contact area of the electrodes, where e.g. the coating in this area has been removed, so that an electric current can flow between the electrodes. Due to the electrically non-conductive coating or the surrounding insulating material of the electrodes, the latter may e.g. be joined by a screw connection, so that e.g. the coated or potted electrodes will then form the stamp together. In this way, clamping of the sausage neck can take place at the electrode which is coated or surrounded by insulating material, without an electric short circuit being caused. In at least one example, clamping can then also be effected via the electrodes.

Advantageously, the distance b between the electrodes arranged side by side lies in a range of 0.5 mm to 3 mm, in such a way that the movable stamp can be dimensioned such that it can be placed between two filled sausage casings.

According to an advantageous embodiment, at least one, in particular two of the opposed stamps may be supported to be rotatable about an axis $A_2$ and/or $A_3$, which extends along a longitudinal direction L, in such a way that the opposed clamping surfaces extend substantially parallel to each other. Since the rotatably supported stamps and thus, of course, also the electrodes integrated therein or connected thereto are rotatably supported, manufacturing tolerances and/or positioning errors of the operator can be compensated for. This is important, since the opposed clamping surfaces must be approximately parallel, so as to guarantee that the sausage neck will be clamped.

The electrodes and the stamps can be moved relative to and towards one another manually or by means of a positioning drive, in particular a pneumatic or an electric positioning drive.

However, it will be particularly advantageous when the closure module is configured as a hand-held device with a handle area that comprises two spaced-apart, opposed handle elements, which are movable relative to and towards each other and which are each coupled with the respective stamps such that, when the handle elements are moved towards each other, also the respective electrodes and stamps will move towards one another. A hand-held device of the type in question is particularly easy to handle and can e.g. easily be used by the operator in the form of hand pliers. It will be particularly advantageous when the hand pliers are configured such that the two handle elements are rotatably supported.

According to one or more embodiments, the closure module has, on its end facing away from the handle area, a hook-shaped bow comprising in particular two portions tapering into a tip. Since the bow extends around the front end of the closure module, the bow serves as a protection against damage. Since the hook-shaped bow is open on one side, the bow can be used for positioning the module, when the latter is not in use.

The method according to the present disclosure used for closing and/or separating filled sausage casings connected via a sausage neck comprises the following steps: placing a sausage neck between a first stamp and a second stamp, moving the stamps relative to and towards each other such that the stamps will be closed and will clamp the sausage neck in position, whereupon a current flows from the first electrode into the sausage neck and via the sausage neck into the second electrode, whereby the filled sausage casings will be closed, and in some examples, additionally separated from each other.

In the course of this process, the sausage neck can be clamped in position by the stamps, at least on the side of the electrodes facing the respective rounded sausage end. The end face of the electrodes may also be part of the clamping surface. During a first time interval $t_1$, the electrodes supply an amount of energy per unit time, such that the sausage neck is heated so strongly that e.g. the protein in the sausage neck will coagulate. Coagulation occurs e.g. at a temperature in the range of 65° C. to 100° C. The filled sausage casings can thus be closed. If it is now also intended to separate the filled sausage casings from one another, the supply of energy can be continued during a second time interval. In so doing, the amount of energy per unit time can be increased, in particular in a peaklike manner, such that the sausage neck will decompose and will be cut off. Advantageously, the stamp elements will not be moved apart until the supply of current has been interrupted, i.e. the clamping of the sausage neck will not be eliminated until the flow of current through the electrodes has terminated.

The closure module is particularly suitable for use with electrically conductive sausage casings, such as sheep-intestine casings, pig-intestine casings, bovine-intestine casings and collagen casings.

High-frequency currents, in particular in a frequency range of 300 kHz to 500 kHz, in a voltage range of 50 to 500 V, in particular in a voltage range of 80 to 430 V, proved to be advantageous for the method according to the present disclosure.

In the following, the present disclosure will be explained in more detail making reference to the figures following hereinafter.

BRIEF DESCRIPTION OF THE FIGURES

FIGS. 1-8 show the relative positioning of various components of a closure module. If shown directly contacting each other, or directly coupled, then such components may be referred to as directly contacting or directly coupled, respectively, at least in one example. Similarly, components shown contiguous or adjacent to one another may be contiguous or adjacent to each other, respectively, at least in one example. As an example, components lying in face-sharing contact with each other may be referred to as in face-sharing contact or physically contacting one another. As another example, elements positioned apart from each other with only a space therebetween and no other components may be referred to as such, in at least one example.

As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. In at least one example FIGS. 1-8 may be drawn to scale, although other relative dimensions may be used.

Figure 1A:
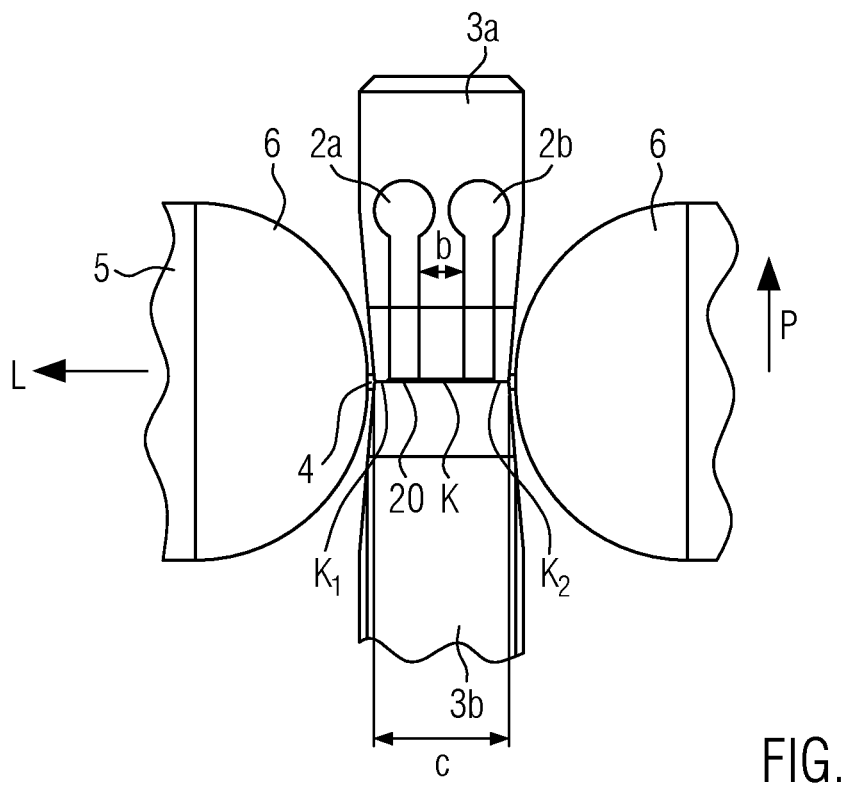
FIG. 1a shows a section through an embodiment of a closure module according to the present disclosure.

FIG. 1a shows schematically a first embodiment of a closure module 1 according to the present disclosure. The closure module 1 serves to close, or to close and separate filled sausage casings 5 connected via a sausage neck. Such electrically conductive sausage casings may e.g. be a natural casing kept in salt water or an artificial or collagen casing. The sausage casing is filled in advance e.g. by means of a filling machine, a vacuum filler by way of example, with a pasty mass, e.g. sausage meat. By constricting or dividing the filled sausage casings within a twist-off line, a sausage chain of a plurality of interconnected, filled sausage casings 5, i.e. portions, is obtained, the filled sausage casings 5 being connected to one another via a twisted sausage neck 4. As can be seen from FIG. 1a, the rounded ends 6 of the filled sausage casings 5 are interconnected via the sausage neck 4. The interconnected sausage chains consisting of a plurality of interconnected portions are then closed by the closure module 1 e.g. such that the filled sausage casings cannot open again, e.g. during a separation process with the aid of a knife. However, as will be described in more detail hereinafter, it is also possible to close, with the aid of the closure module 1, the filled sausage casings 5 by the closure module 1 and to cut through the sausage neck. Closing at the end of a sausage chain is possible as well.

As can be seen from FIG. 1a, the closure module 1 according to the present disclosure comprises two electrodes 2a, 2b, which are here arranged side by side in the longitudinal direction L of the straightened sausage neck, i.e. in the direction of the straightened sausage neck. The two electrodes are spaced apart e.g. by a distance b in a range of 0.5 mm to 3 mm. The longitudinal direction L also corresponds to the longitudinal direction L of the closure element. The two electrodes 2a, 2b are here integrated in a stamp 3a of insulating material. The closure module comprises a further stamp 3b, which, as shown in FIG. 1a, is located opposite the stamp element 3a in the closed condition, the sausage neck 4 being adapted to be placed between the stamps 3a, 3b. In the closed condition of the stamps 3a, 3b, the sausage neck 4 can be clamped in position. The two stamps 3a, 3b can be moved towards each other until they enter into contact with each other. In the closed condition of the stamps 3a, 3b, a clamping point K is obtained, which clamps the sausage neck 4. The end face of the electrodes constitutes here a part of the clamping surface. It is, however, of essential importance that at least on the respective side of the electrodes 2a, 2b facing the rounded end 6, a clamping point K1, K2 is realized. This clamping is advantageous, since, due to the e.g. twisted-off division point and the displacement of the sausage meat, mechanical stresses acting on the sausage casing arise at the rounded sausage end 6. If a current is now introduced at the rounded sausage end 6, the sausage casing 5 under mechanical stress may tear when heated. Due to the fact that the sausage neck 4 is clamped before the transition to the rounded sausage end or ends 6, the mechanical stresses are "held back". Through the electrodes 2a, 2b a current is introduced between the clamping points K1, K2 within the sausage neck 4 or the open sausage end and will thus not flow across the rounded sausage ends, which are under mechanical stress, but from the first electrode into the sausage neck, along the distance b in the longitudinal direction L through the sausage neck into the second electrode 2b. The width c of the stamps 3a, 3b is generally smaller than the length of the sausage neck 4, so that the stamps having the electrodes integrated therein can be placed between the sausage portions, and lies e.g. in a range of 3 mm-10 mm. In the embodiment shown in FIG. 1a, the electrodes 2a, 2b may be potted in the insulating material of the stamps.

Figure 1B:
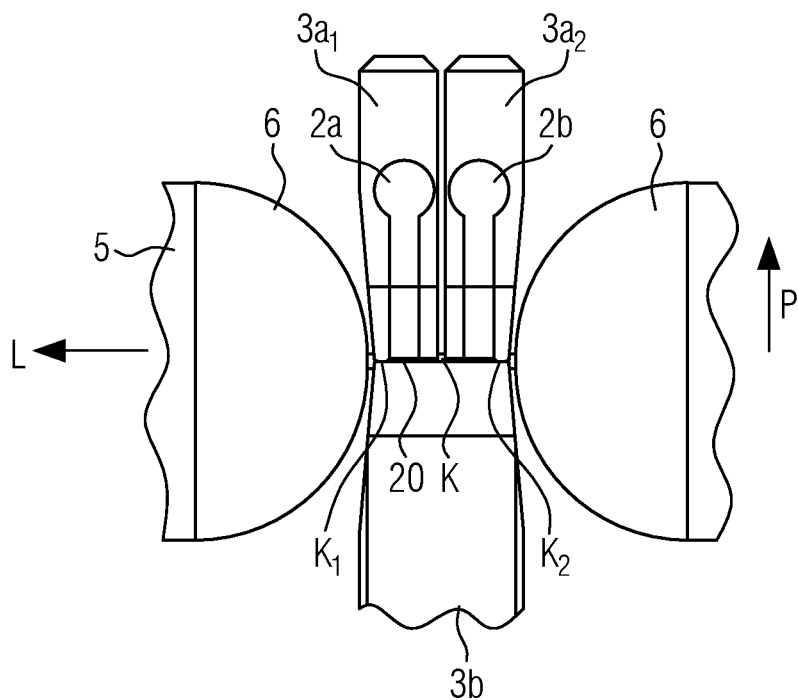
FIG. 1b shows a further embodiment of a closure module according to the present disclosure.

FIG. 1b corresponds to the embodiment shown in FIG. 1a, but one stamp 3a is here of a bipartite nature, i.e. the respective electrodes 2a, 2b are either potted into stamp elements $3a_1$ and $3a_2$ of their own, which are made of insulating material, or they are coated in a suitable manner with a coating of insulating material. Just as in the case of the embodiment shown in FIG. 1a, the coating of the electrodes may then be removed at the contact points 20, so that an electric current can flow between the electrodes 2a, 2b. Due to the coating or the insulating material, the two stamp elements $3a_1$, $3a_2$ can be connected to one another e.g. by a screw connection.

Figure 1C:
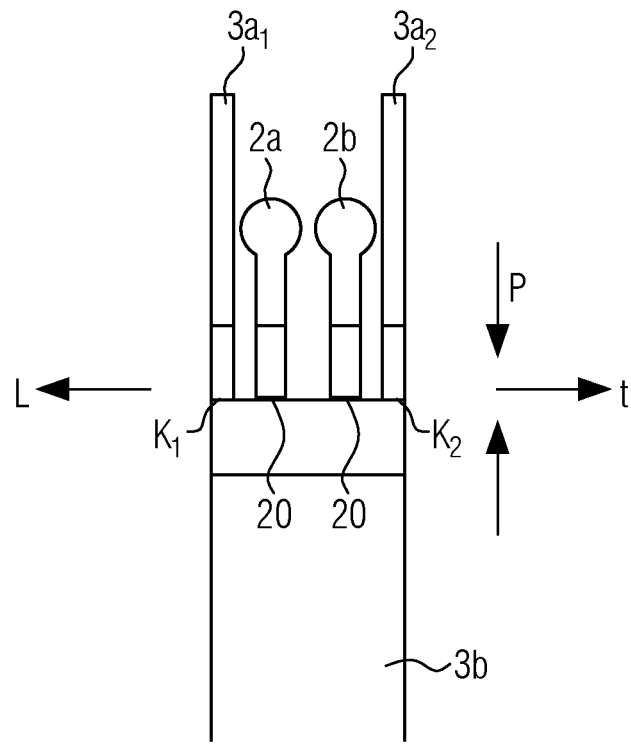
FIG. 1c shows a further embodiment of a closure module according to the present disclosure.

FIG. 1c represents a further embodiment of the present disclosure and corresponds essentially to the embodiment shown in FIGS. 1a and 1b, the upper stamp 3a, by way of example, being here defined by two separate electrodes 2a, 2b, which are laterally spaced apart in the longitudinal direction L, and by separate stamp elements $3a_1$ and $3a_2$. The individual elements may e.g. be fixed to a common support, which is not shown, and they define the stamp in common. The electrodes 2a and 2b, except for the contact area 20, may again be provided with an insulation. The stamp elements $3a_1$, $3a_2$ serve to establish the clamping points K1 and K2 together with the lower stamp 3b. In at least one example, the end faces of the electrodes 2a, 2b are also located in the same plane as the end faces of the stamp elements $3a_1$, $3a_2$, so that the sausage neck 4 will also be clamped by the electrodes 2a, 2b.

In this embodiment as well as in the other embodiments, the electrodes need not necessarily clamp the sausage neck 4, but it is of essential importance that, in the closed condition of the stamps, the distance between the respective end face of the electrodes and the opposite stamp is small enough for allowing the end faces of the electrodes to contact the sausage neck, which serves as an electrolyte.

Figure 1D:
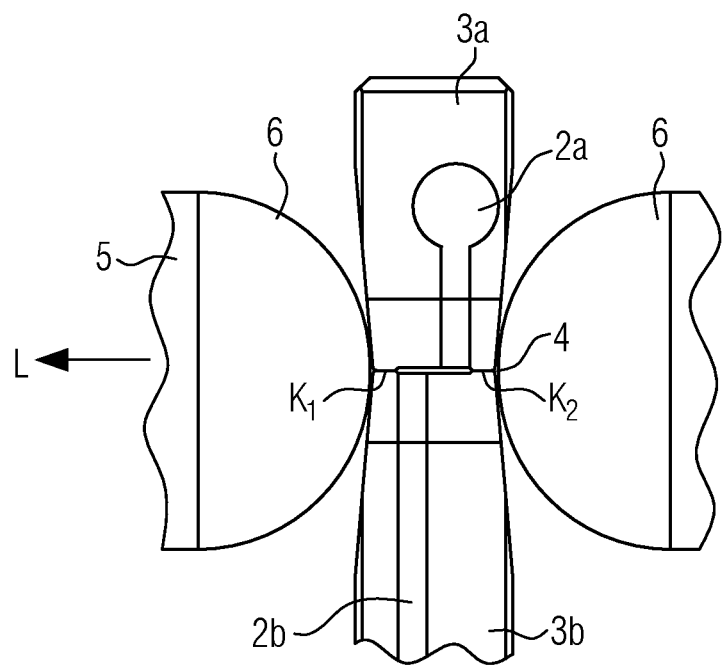
FIG. 1d shows a further embodiment of a closure module according to the present disclosure.

FIG. 1d shows a further embodiment of a closure module according to the present disclosure. However, the electrodes are here integrated in respective stamps 3a, 3b on opposite sides of the sausage neck 4. Just as in the case of the preceding embodiments, also the stamps 3a, 3b of the present embodiment can be moved towards each other until they enter into contact with each other such that the sausage neck 4 is positioned therebetween. Just as in the case of the preceding embodiments, a current can flow across an electrode 2a, initially in the longitudinal direction L through the sausage casing, and can then flow off through the electrode 2b.

Figure 1E:
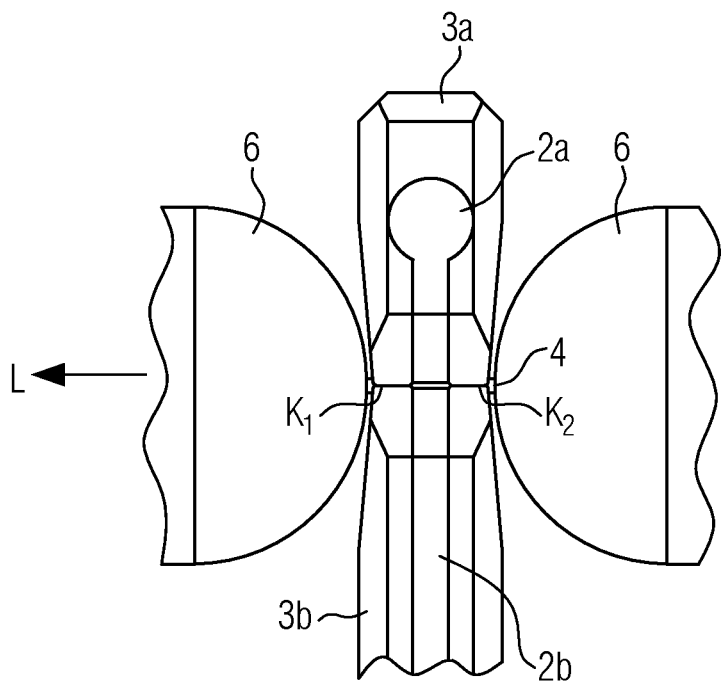
FIG. 1e shows a further embodiment of a closure module according to the present disclosure.

FIG. 1e shows a further embodiment according to the present disclosure, the electrodes 2a, 2b being here again arranged on opposite sides in the movable stamps 3a, 3b. However, they are not spaced apart laterally, i.e. when seen in the longitudinal direction L, as in the case of FIG. 1d, but arranged in opposed relationship with each other. It follows that, also in this case, current can flow from the electrode 2a perpendicularly through the sausage neck 4 to the electrode 2b. Other than in embodiments 1a to 1d, the stamps 3a, 3b can here only be moved towards each other to such an extent that a short circuit between the electrodes 2a, 2b will be prevented. A minimum distance of 0.1 mm is here necessary between the electrodes.

Figure 2:
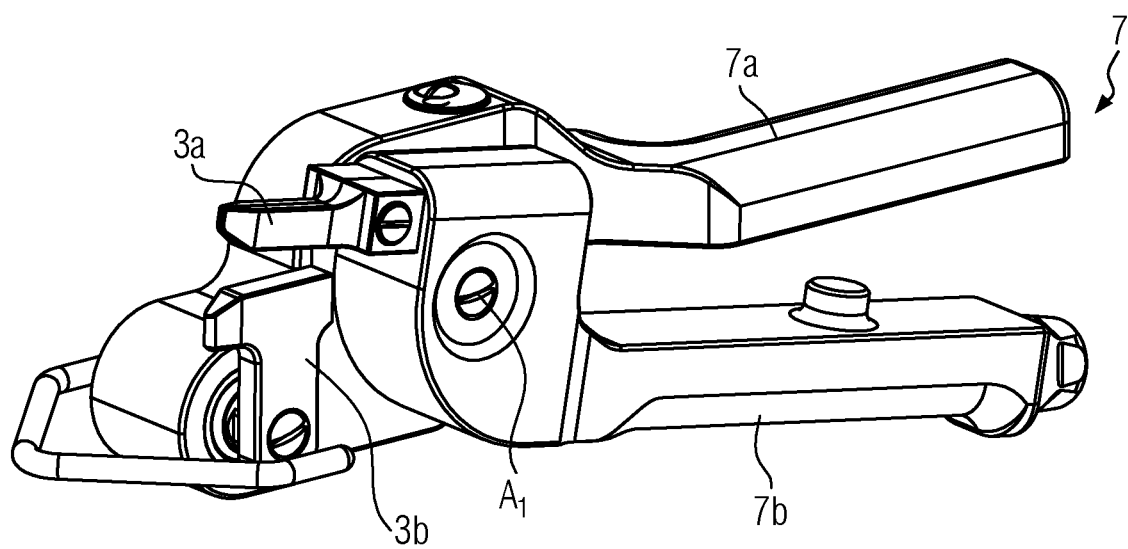
FIG. 2 shows an example of a closure module according to the present disclosure in the form of hand pliers.
Figure 3:
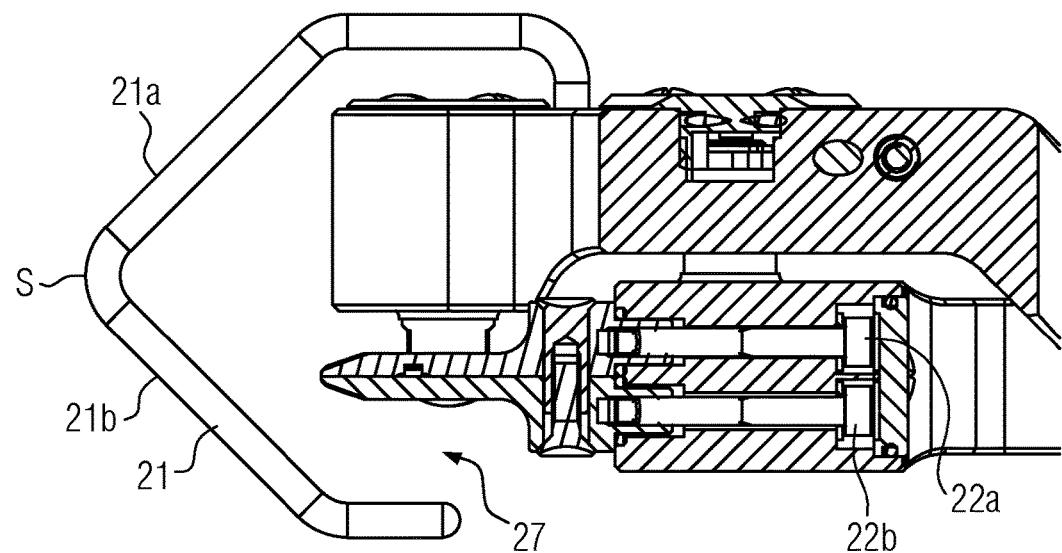
FIG. 3 shows a partially broken-up top view of FIG. 2.
Figure 4:
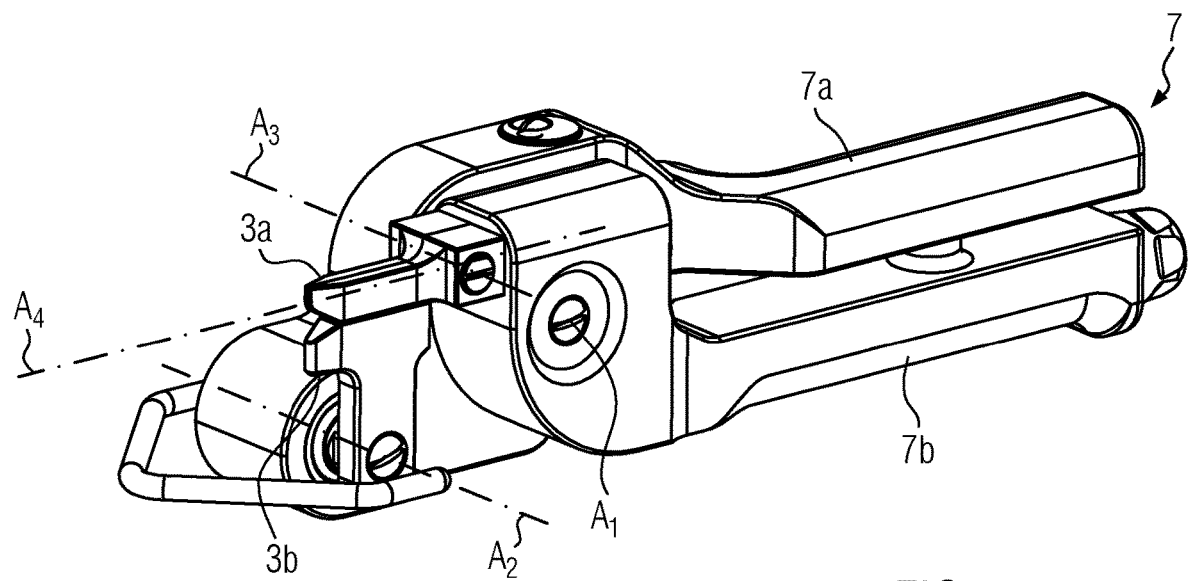
FIG. 4 shows the closure module, which is shown in FIG. 2, in a closed condition.

FIGS. 2 to 7 show an embodiment according to the present disclosure, the closure module 1 being here configured as a hand-held module, in particular as hand pliers. To this end, the closure module comprises a handle area 7 with two handle elements 7a, 7b movable relative to one another and extending perpendicular to the longitudinal direction L. The upper elongate handle element 7a is coupled to the lower stamp 3b, which, by way of example, does not comprise any electrode in the present embodiment and serves only as an anvil. The lower handle element 7b is coupled to the stamp 3a, which comprises two electrodes 2a, 2b. The handle elements 7a, 7b are supported such that they are rotatable about the axis $A_1$. When the handle elements 7a, 7b are now moved towards each other, also the stamps 3a, 3b will move towards each other—until a closed position is reached, as shown in FIG. 4. Even though this is not shown, the handle elements 7a, 7b may be pretensioned into an open position by a spring.

Figure 7:
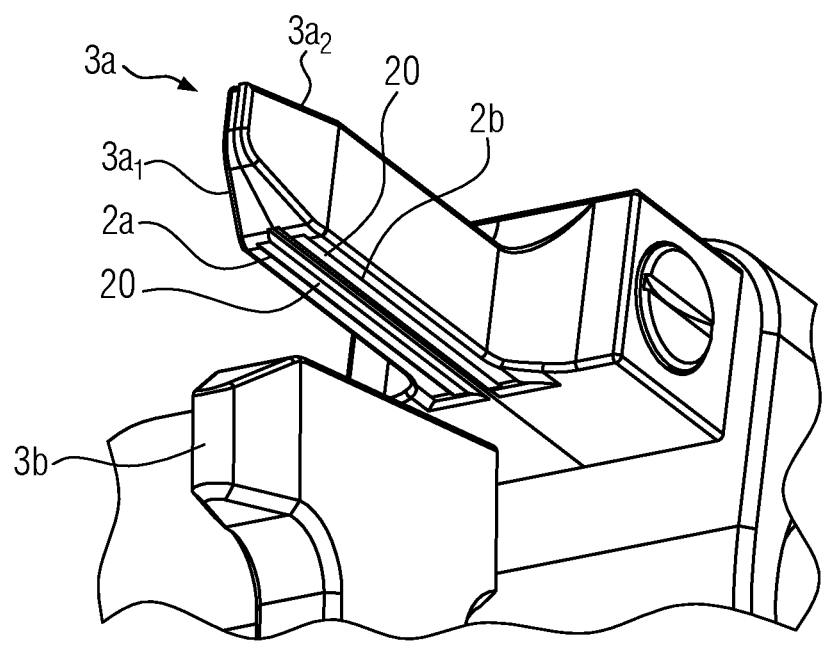
FIG. 7 shows, in a perspective representation, a view of the embodiment shown in FIGS. 2 to 6.

As can especially be seen from FIG. 7, which is a perspective representation seen at an oblique angle from below, this embodiment comprises two electrodes 2a, 2b, which are arranged in the upper stamp 3a. The upper stamp 3a is composed of two stamp elements $3a_1$ and $3a_2$, as has been explained hereinbefore in connection with FIG. 1b. The stamp elements $3a_1$ and $3a_2$ comprise the interior electrodes 2a and 2b, which are exposed at the contact areas 20. The two stamp elements $3a_1$, $3a_2$ are connected to one another, their exterior surfaces converging at a substantially acute angle such that the stamp 3a can easily be moved to a position between the sausages. Also the lower stamp 3b tapers substantially conically in a forward direction. As can especially be seen from FIG. 3, the electrodes 2a, 2b are connected to the electrode terminals 22a, 22b and are supplied with power via these terminals. The power supply may take place via a cable, which is not shown.

According to one or more embodiments, the lower stamp 3b is supported to be rotatable about the axis $A_2$, shown freely rotatable in this example. Additionally or alternatively, also the stamp element 3a may be supported to be rotatable, in particular freely rotatable, about the axis $A_3$. The axes $A_2$, $A_3$ extend substantially along the longitudinal direction L, i.e. along a direction corresponding to the straightened sausage neck 4 and substantially perpendicular to a direction of the longitudinal axis of the handle elements 7a, 7b. In this way, the opposed clamping surfaces are allowed to extend substantially parallel to one another, so as to achieve an optimum clamping effect. According to this and also according to the other embodiments, it is also possible that the upper and/or lower stamps (for example, the upper stamp) are supported to be freely rotatable about a respective axis $A_4$, which extends e.g. in a direction substantially perpendicular to the axes $A_1$, $A_3$ and to the longitudinal axis of the closure module, so as to compensate tolerances and ensure that the end faces of the stamps are oriented correctly and parallel to each other.

Figure 5:
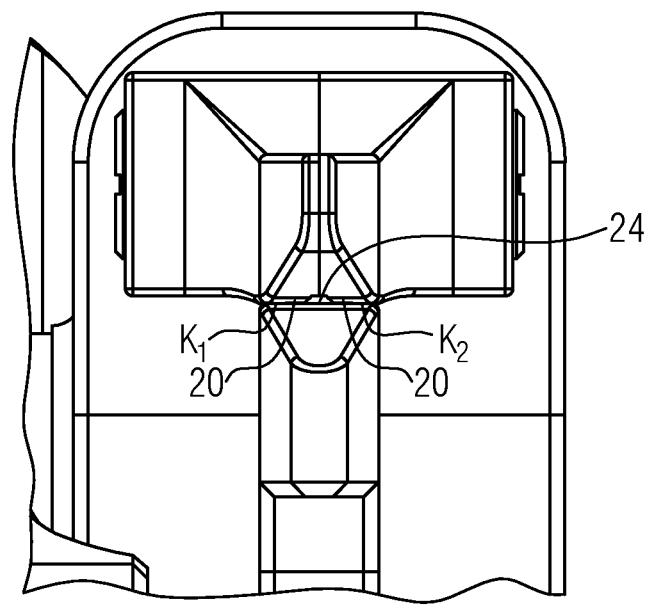
FIG. 5 shows a front view of the closure module shown in FIGS. 2 to 4.

FIG. 5 shows a front view of the closure module 1. In this embodiment, an opening 24 may be provided e.g. between the clamping surfaces or points K1, K2. It is of essential importance that the clamping point K1 is arranged between the electrode 2a and the rounded sausage end 6 and that the clamping point K2 is arranged between the electrodes 2b and the opposite rounded sausage end 6, as can especially be seen from FIG. 6. The clamping point of the sausage neck 4 is located in front of the left rounded sausage end 6 and the clamping point K2 is located in front of the right rounded sausage end, as can be seen from FIG. 6.

As can be seen from FIGS. 2, 3 and 4, this embodiment comprises optionally a hook-shaped bow 21, which is arranged on the end facing away from the handle area 7 and which surrounds this end in a bow-shaped manner. This bow 21 thus serves as a protection against damage. In particular, the bow 21 has e.g. two portions 21a and 21b tapering into a tip S. In the top view, an opening 27 can be seen in a lateral area, so that the bow 21 can be used as a hook, e.g. for positioning the module in the case of non-use. However, the hook-shaped bow need not necessarily taper, but it goes without saying that it may also have a different, e.g. rounded, shape.

Figure 8:
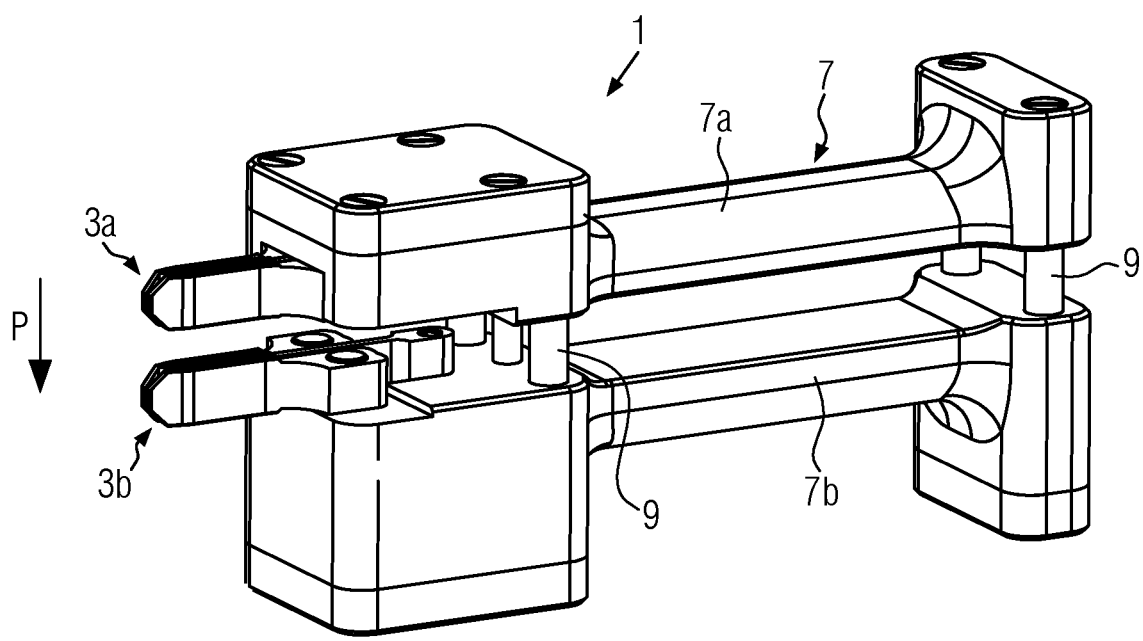
FIG. 8 shows a further possible embodiment according to the present disclosure.

The hand-held device need not necessarily have the form of pliers, but, as shown e.g. in FIG. 8, it may also be configured as a hand-held module, in the case of which the stamps 3a, 3b move towards each other, when the handle elements 7a, 7b are moved towards each other. To this end, a column guide 9 may be provided, by way of example.

FIGS. 3 and 4 show that, at the closed position, a voltage can be applied to the electrodes 2a, 2b for the purpose of closing and separating. The voltage supply may either be started e.g. automatically via a position switch, when the closure module is at a closed position (e.g. at a position of contact), or activated manually via a switch which is not shown.

The latter may be a switch on the device or e.g. a foot switch.

According to one or more examples, the voltage supply takes place automatically. A measuring potential is applied between the two electrodes. Making use of the measuring potential, e.g. the resistance between the electrodes can be measured and, depending on the resistance, it can be determined whether a sausage casing is present between the electrodes. If it is determined that a sausage neck is present between the electrodes in the closure module, the voltage and/or the current and consequently the closing power will be increased, in particular after an adjustable period of time.

In this case, the sausage neck serves as an electrolyte between the electrodes 2a, 2b.

In the following, the method according to the present disclosure will be explained in more detail making reference to FIGS. 1 to 7.

Figure 6:
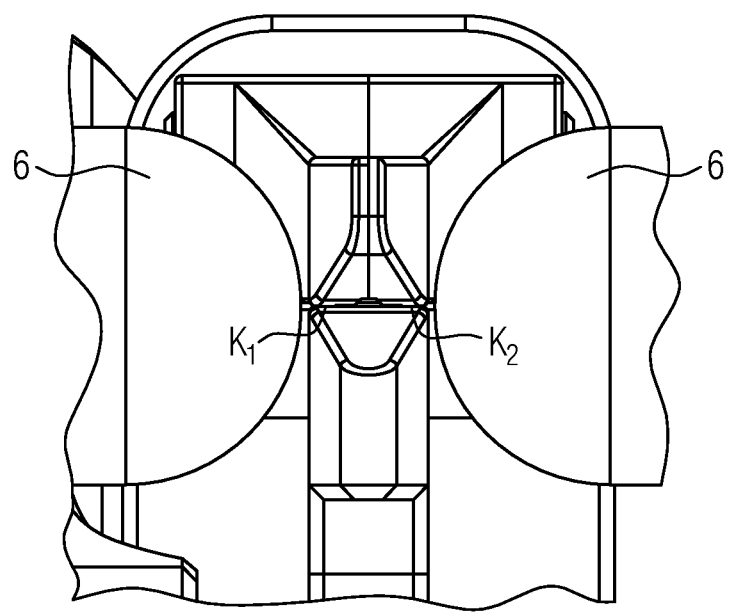
FIG. 6 shows a front view with product of the closure module shown in FIGS. 2 to 5.

For closing, or for closing and separating filled sausage casings 5 connected via a sausage neck 4, the closure module 1 is first placed e.g. between two filled sausage casings 5 or at an open sausage end (not shown), as shown e.g. in FIG. 6. In order to allow this, the closure module 1 is at an open position, as shown e.g. in FIG. 2. The opposed stamps 3a, 3b are then introduced in an area between filled sausage casings 5, such that the sausage neck 4 is placed between the stamps 3a, 3b, as shown e.g. in FIG. 6 or FIG. 1a to 1e. For the purpose of closing, or closing and separating, the stamps must now be moved relative to each other, as shown by the arrow P in the figures. For this purpose, e.g. an operator may use the closure module like gripping pliers, take hold of the handle area 7 and move the handle elements 7a, 7b towards each other.

When the handle elements 7a, 7b are now moved towards each other, also the stamps 3a, 3b will move towards each other until they arrive at an end position where at least the clamping points K1, K2 are provided, which have been explained in more detail hereinbefore and which clamp the sausage neck in position. Via the electrically conductive sausage neck 4, the electrodes 2a, 2b are now connected to one another in an electrically conductive manner, irrespectively of their configuration according to FIG. 1a to e. Through a position switch or through manual operation of a respective switch, current can then flow from a current source (not shown) via cables, which are not shown either, via the electrode terminal and the electrode 2a into the sausage neck 4 and from there into the additional electrode 2b. As shown e.g. in FIG. 1a and as can also be seen from FIG. 7, it will be particularly advantageous when the current flows first from the electrode 2a into the sausage neck 4 and then through the sausage neck in the longitudinal direction L of the sausage neck to the second electrode 2b. This results in an enlarged area having a length of 2.5 mm-8 mm through which the current flows.

Currents which proved to be particularly suitable are high-frequency currents in a frequency range of 300 kHz to 500 kHz. The voltage lies advantageously in a range of 50 to 500 V, in particular 80 to 430 V. The electric energy is converted into thermal energy and heats the sausage neck, e.g. to temperatures of 60 to 350° C. In this temperature range, e.g. the thermal denaturation of collagen begins, a sign indicating this denaturation being a whitish discoloration.

From approx. 100° C. onwards, the water evaporates and the e.g. open natural casing coagulates and is closed in this way. In response to a further supply of energy, the temperature rises and the sausage neck decomposes and is cut off.

This means that the sausage casing will first coagulate and that, in response to a further supply of energy, the casing will decompose. The higher the amount of energy supplied per unit time (electric power) is, the faster the rise in temperature of the sausage neck, e.g. natural casing, will be. If an excessive amount of power is supplied, a denaturation of the casing may perhaps not take place, but the casing will be heated fast and decompose. The division point is not coagulated and not closed. Therefore, the power should not be excessively high, so that denaturation can take place slowly and reliable closing can thus be guaranteed. Hence, the power applied for closing should be in a range of e.g. 40 W to 150 W, for example between 50 W and 100 W.

According to at least one embodiment, a certain amount of energy per unit time is supplied during a first time interval $t_1$, such that the sausage neck is heated and will close, in particular coagulate. If it is also intended to cut off the sausage neck 4, a power increase, in particular a peaklike power increase, can take place during a second time interval $t_2$. This results in fast cutting off. The current supply is then terminated either manually or automatically, e.g. after a predetermined period of time or by triggering a switch or a position switch. The stamps 3a, 3b can then be moved apart in a direction opposite to the direction of the arrow P, so that, as can be seen from FIG. 2, a distance between the stamps 3a, 3b is again established and the module can be removed.

Instead of manually moving the stamps 3a, 3b towards and away from each other, they may also be moved by a positioning drive, in particular a pneumatic or an electric positioning drive.

It will be appreciated that the configurations and/or approaches described herein are exemplary in nature, and that these specific embodiments or examples are not to be considered in a limiting sense, because numerous variations are possible. The subject matter of the present disclosure includes all novel and nonobvious combinations and sub-combinations of the various features, functions, acts, and/or properties disclosed herein, as well as any and all equivalents thereof.

The invention claimed is:

1. A closure module for closing and/or separating filled sausage casings connected via a sausage neck, comprising:
   two stamps movable relative to and towards each other and arranged such that a sausage neck is placed therebetween, the stamps capable of clamping the sausage neck in a closed condition, and further comprising a first electrode and a second electrode, through which, in a closed condition of the stamps, a current flows from the first electrode into the sausage neck and via the sausage neck into the second electrode.

2. The closure module according to claim 1, wherein the first electrode and the second electrode are arranged such that, in the closed condition of the stamps, the first electrode and the second electrode are spaced apart from rounded sausage ends of the filled sausage casings such that the electrodes do not contact the filled sausage casings, the electrode sides facing outwards having in particular provided thereon an insulating material.

3. The closure module according to claim 1, wherein a clamping point of the stamps is arranged on at least a respective side of the first electrode and the second electrode facing a rounded sausage end of the sausage neck.

4. The closure module according to claim 3, wherein both of the first electrode and the second electrode are arranged in one of the stamps in spaced relationship with each other, or wherein the first electrode is arranged in one of the stamps and the second electrode is arranged in the opposite stamp.

5. The closure module according to claim 3, wherein the first electrode and the second electrode are arranged on opposite sides of the sausage neck such that they are laterally displaced relative to each other.

6. The closure module according to at least claim 3, wherein the first electrode and the second electrode, except for a contact area of the first electrode and the second electrode, are provided with an insulating coating or are potted in an insulating material.

7. The closure module according to claim 1, wherein the first electrode and the second electrode in the stamps are insulated towards an outside, and wherein a free contact area is only provided on ends of the first electrode and the second electrode facing the sausage neck.

8. The closure module according to claim 7, wherein the stamps are configured as integral components or wherein each electrode is arranged in a stamp element of its own.

9. The closure module according to claim 1, wherein a distance between the first electrode and the second electrode arranged side by side lies in a range of 0.5 mm to 3 mm.

10. The closure module according to claim 1, wherein at least one of the stamps is supported to be rotatable, including freely rotatable, about an axis $A_2$, $A_3$ which extends along a longitudinal direction L, in such a way that opposed clamping surfaces extend substantially parallel to each other.

11. The closure module according to claim 1, wherein the first electrode, the second electrode, and the stamps are movable relative to and towards one another manually or by means of a positioning drive.

12. The closure module according to claim 11, wherein the positioning drive is a pneumatic or an electric positioning drive.

13. The closure module according to claim 1, wherein the closure module is configured as a hand-held device with a handle area that comprises two spaced-apart, opposed handle elements, which are movable relative to and towards each other and which are each coupled with the stamps respectively such that, when the handle elements are moved towards each other, the first electrode, the second electrode, and the stamps will move towards each other, and wherein the hand-held device is configured as hand pliers whose handle elements are rotatably supported.

14. The closure module according to claim 13, wherein the closure module has, on an end of the closure module facing away from a handle area, a hook-shaped bow comprising in particular two portions tapering into a tip.

15. A method for closing and/or separating filled sausage casings connected via a sausage neck, comprising the following steps:
   placing a sausage neck between a first stamp and a second stamp;
   moving the first stamp and the second stamp relative to and towards each other such that the first stamp and the second stamp close and clamp the sausage neck in position, whereupon a current flows from a first electrode into the sausage neck and via the sausage neck into a second electrode, whereby the filled sausage casings are closed or additionally separated from each other.

16. The method according to claim 15, wherein the sausage neck is clamped in position by the first stamp and the second stamp, at least on sides of the first electrode and the second electrode facing a respective rounded sausage end.

17. The method according to claim 15, wherein, during a first period of time $t_1$, an amount of energy per unit time is supplied through the electrodes such that the sausage neck is heated and closed, and, in particular during a second period of time $t_2$, the supply of energy is continued and the amount of energy per unit time is preferably increased, in particular in a peaklike manner, such that the sausage neck decomposes and is cut off.

18. The method according to claim 15, wherein the current is a high-frequency current, in particular in a frequency range of 300 kHz to 500 kHz.

19. The method according to claim 15, wherein a voltage in a range of 50 V to 500 V is applied to the first electrode and the second electrode.

20. The method according to claim 15, wherein the clamping of the sausage neck is not eliminated until the flow of current through the electrodes has terminated.

* * * * *